United States Patent
Gochoo et al.

(10) Patent No.: US 11,080,981 B1
(45) Date of Patent: Aug. 3, 2021

(54) SYSTEM AND METHOD FOR SOCIAL DISTANCING COMPLIANCE

(71) Applicant: UNITED ARAB EMIRATES UNIVERSITY, Al Ain (AE)

(72) Inventors: Munkhjargal Gochoo, Al Ain (AE); Fady Alnajjar, Al Ain (AE); Waleed Khalil Ahmed, Al Ain (AE); Muthanna Ahmed Aziz, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/117,845

(22) Filed: Dec. 10, 2020

(51) Int. Cl.
| | |
|---|---|
| G08B 1/08 | (2006.01) |
| G08B 21/04 | (2006.01) |
| G06T 7/60 | (2017.01) |
| G06K 7/10 | (2006.01) |
| G06K 19/07 | (2006.01) |
| G06T 7/13 | (2017.01) |

(52) U.S. Cl.
CPC ..... G08B 21/0492 (2013.01); G06K 7/10366 (2013.01); G06K 19/0723 (2013.01); G06T 7/13 (2017.01); G06T 7/60 (2013.01); G06T 2207/10048 (2013.01)

(58) Field of Classification Search
CPC .......... G08B 21/0492; G08B 21/02; G08B 21/0476; G08B 21/245; G08B 3/10; G08B 21/22; G08B 13/19; G06T 7/60; G06T 7/13; G06T 2207/1008; G06K 7/10366; G06K 19/0723; G06K 9/00281; G06K 9/00778; G16H 15/00; G16H 50/20
See application file for complete search history.

(56) References Cited

U.S. PATENT DOCUMENTS

| | | | |
|---|---|---|---|
| 5,576,972 A | 11/1996 | Harrison | |
| 10,529,216 B1 | 1/2020 | Thibault et al. | |
| 10,803,714 B1 * | 10/2020 | Khera | F21L 4/00 |
| 2011/0050444 A1 | 3/2011 | Stull | |
| 2016/0349792 A1 | 12/2016 | Alameh et al. | |
| 2020/0279464 A1 * | 9/2020 | Llewelyn | G16H 10/60 |

(Continued)

FOREIGN PATENT DOCUMENTS

AU 2020101100 A4 7/2020

OTHER PUBLICATIONS

"Aura Aware"; printed on Nov. 9, 2020 from https://aura-aware.com/products/aura-protect.

(Continued)

*Primary Examiner* — Toan N Pham
(74) *Attorney, Agent, or Firm* — Nath, Goldberg & Meyer; Richard C. Litman

(57) ABSTRACT

The system and method for social distancing compliance generates an alarm when at least two people are separated by a distance that is less than a predetermined threshold value. Thermal imaging is used to detect at least two people using at least one thermal image sensor. At least one distance is calculated between the at least two people, and it is determined if the at least one distance is less than a predetermined threshold value. If the calculated at least one distance is less than the predetermined threshold value, at least one of the at least two people is alerted that a minimum safe distance is not being met.

11 Claims, 4 Drawing Sheets

(56) References Cited

U.S. PATENT DOCUMENTS

2020/0281298 A1* 9/2020 Dey ................. G08B 21/22
2020/0365002 A1* 11/2020 Modiano ............ G08B 3/10

OTHER PUBLICATIONS

"Maintaining Social Distancing in the Workplace with Radio Frequency Proximity Sensing"; printed on Nov. 9, 2020 from https://www.terabee.com/ensure-social-distancing-and-maximize-safety-with-terabees-covid-19-solutions/.

"SparkFun Grid-EYE Infrared Array Breakout—AMG8833 (Qwiic)", printed from www.sparkfun.com/products/14607 on Dec. 6, 2020.

\* cited by examiner

SYSTEM AND METHOD FOR SOCIAL DISTANCING COMPLIANCE

BACKGROUND

1. Field

The disclosure of the present patent application relates to the practice of social distancing to prevent the spread of contagious diseases, and particularly to a system and method for social distancing compliance that uses automated monitoring to send alerts to people when a predetermined distance between them is not maintained.

2. Description of the Related Art

Social distancing is a set of non-pharmaceutical interventions or measures intended to prevent the spread of a contagious disease by maintaining a physical distance between people and reducing the number of times people come into close contact with each other. Social distancing typically involves keeping a certain distance from others and avoiding gathering together in large groups. By minimizing the probability that a given uninfected person will come into physical contact with an infected person, disease transmission can be reduced, resulting in fewer deaths.

Social distancing measures are most effective when the infectious disease spreads via one or more of the following methods: droplet contact, direct physical contact, indirect physical contact (such as by touching a contaminated surface), and airborne transmission. Authorities have encouraged or mandated social distancing during the COVID-19 pandemic, as it is an important method of preventing transmission of COVID-19. COVID-19 is much more likely to spread over short distances than long ones. Numerous authorities have suggested six feet (in the U.S.) as a minimum distance between people for COVID-19 social distancing practices.

Even for those who are well intentioned, determining if they are six feet from another person may be difficult, particularly when such distance is usually performed by visual estimation alone. In addition to the inherent inaccuracy of measurement among the populace, there are many people who simply forget or ignore social distancing guidelines, thus putting others at risk. Although numerous schemes have been implemented for tracing potentially infected people after they have come in contact with a disease carrier, there is presently very little technology for preventing that contact in the first place. Thus, a system and method for social distancing compliance solving the aforementioned problems are desired.

SUMMARY

The system and method for social distancing compliance generates an alarm when at least two people are separated by a distance that is less than a predetermined threshold value. Thermal imaging is used to detect at least two people using at least one thermal image sensor. For example, in a grocery store, at least one thermal image sensor may be mounted above the aisles for detecting people who are shopping. In addition to detecting people using thermal imaging, each of the people may be identified by the system. At least two mobile devices are associated with the at least two people. In the example of shopping in a grocery store, each mobile device may be fixed to a shopping cart being used by each of the shoppers. Identification information associated the people who are shopping may then be wirelessly read from the mobile device.

Each thermal image sensor may be associated with a corresponding detector unit, and each detector unit may also include, for example, a radio frequency identification (RFID) reader for reading an RFID tag associated with the mobile device for identifying the particular mobile device and the person associated with the particular mobile device. In addition to the RFID reader and RFID tag, or as an alternative thereto, each mobile device may carry a wireless transceiver for wirelessly transmitting the identification information to a wireless transceiver of the nearest detector unit. At least one distance is then calculated between the at least two people.

At least one detector controller is in communication with the at least one thermal image sensor. The at least one detector controller, or an overall system controller which may be in communication with multiple detector controllers respectively associated with multiple detector units, is configured for calculating the at least one distance between the at least two people and determining if the at least one distance is less than a predetermined threshold value.

If the at least two people are separated from one another by less than the predetermined value, at least one of the people is alerted that the minimum safe distance is not being met. The wireless transceiver of the nearest detector unit transmits an alarm actuating signal to at least one of the mobile devices, depending upon the particular situation, and the wireless transceiver associated with the mobile device actuates a local alarm for alerting the corresponding person. Each mobile device may carry an audio alarm, a visual alarm, or both.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
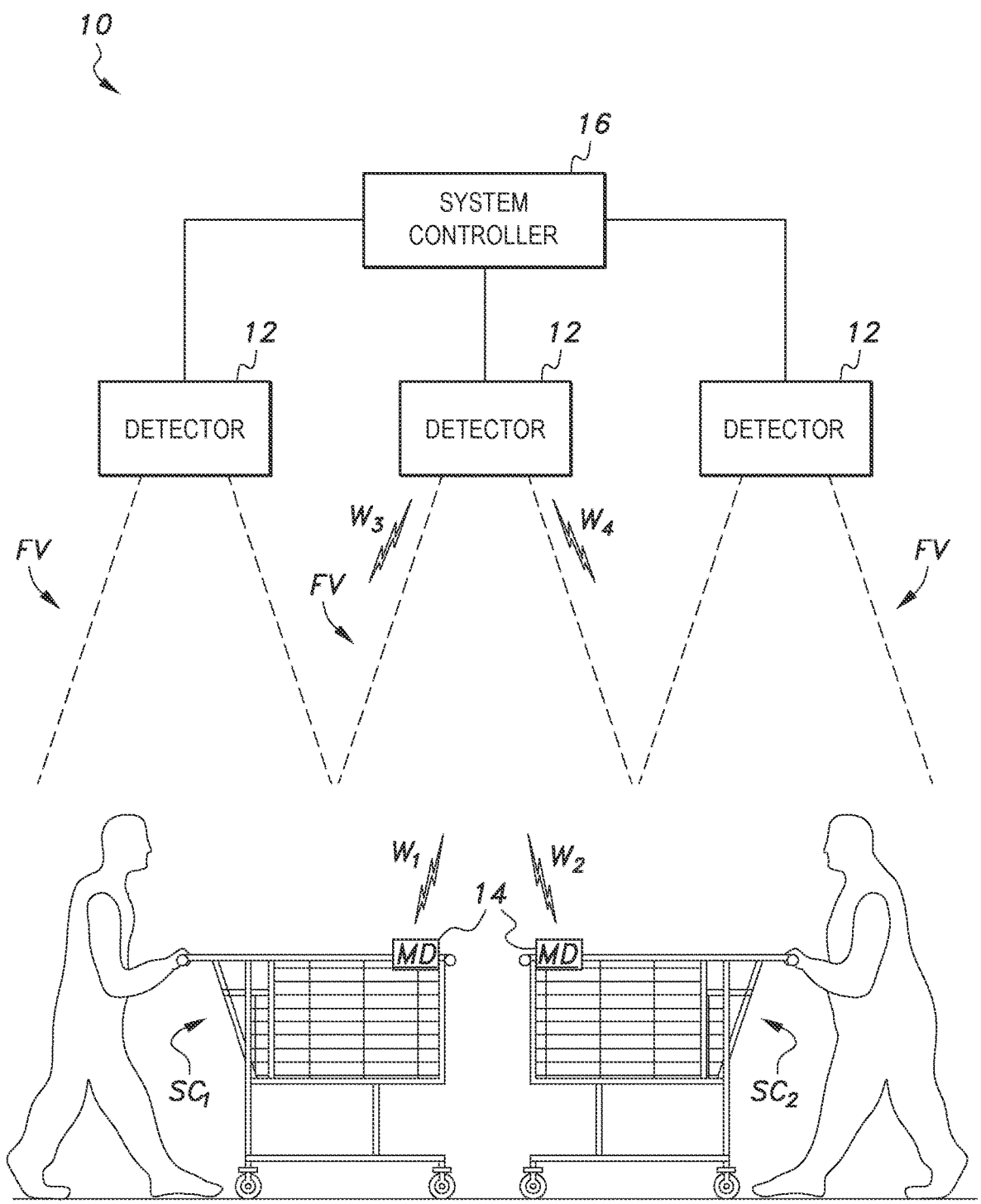
FIG. 1 is a schematic diagram of a system for social distancing compliance.
Figure 2:
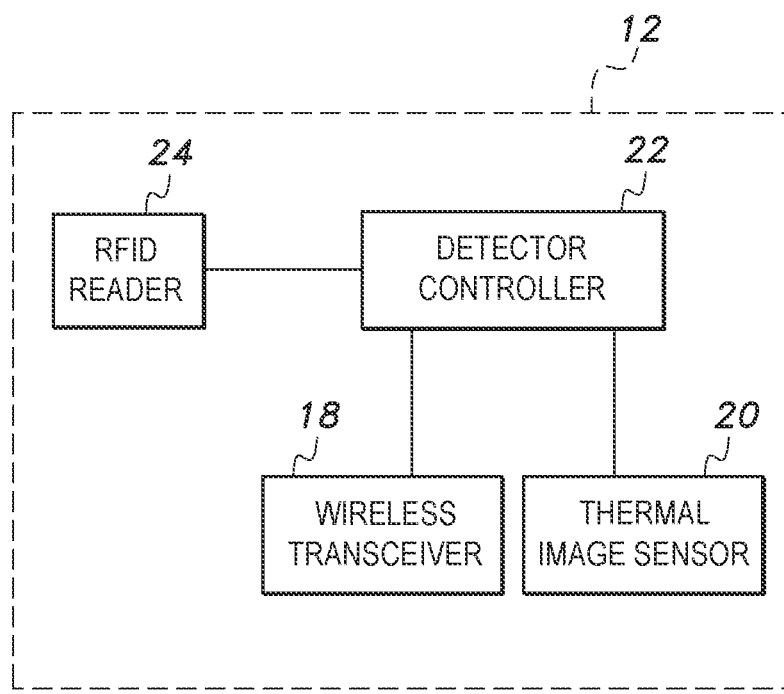
FIG. 2 is a block diagram of a detector in the system for social distancing compliance of FIG. 1.

Referring to FIGS. 1 and 2, the system for social distancing compliance 10 generates an alarm when at least two people are separated by a distance that is less than a predetermined threshold value. Thermal imaging is used to detect at least two people using at least one thermal image sensor 20. In the example of FIG. 1, two people are shopping in a grocery store, where multiple detector units 12 are mounted above the aisles for detecting shoppers. In FIG. 1, three such detector units 12 are shown. However, it should be understood that any suitable number, depending on the size of the zone being monitored, may be used. An overall system controller 16 may be used for interconnecting and coordinating multiple detector units 12. As shown in FIG. 2, each detector unit 12 includes a thermal image sensor 20. It should be understood that any suitable type of thermal image sensor or thermal image camera may be used. For example, an AMG8833 8×8 Thermal Camera Sensor, available through www.sparkfun.com, was used to make a prototype to test the system 10.

In addition to detecting people using thermal imaging, each of the people may be identified by the system 10. In FIG. 1, at least two mobile devices (MDs) 14 may be associated with the at least two people, respectively. For example, in FIG. 1, where two people are shown, two MDs 14 are provided, one for each person. In this example, each mobile device 14 may be fixed to a shopping cart being used by the shoppers, i.e., one mobile device 14 may be fixed to a first shopping cart $SC_1$, and a second mobile device 14 may be fixed to a second shopping cart $SC_2$. It should be understood that shopping carts $SC_1$ and $SC_2$ are shown for exemplary purposes only, and that MDs 14 may be fixed to any suitable type of cart, basket, bag or the like, or, in the alternative, may be held or carried by the shoppers. Information associated with each of the people, e.g., when and where they entered the store, may then be determined from the RFID communications received from the RFID tags incorporated into each mobile device 14.

Figure 3:
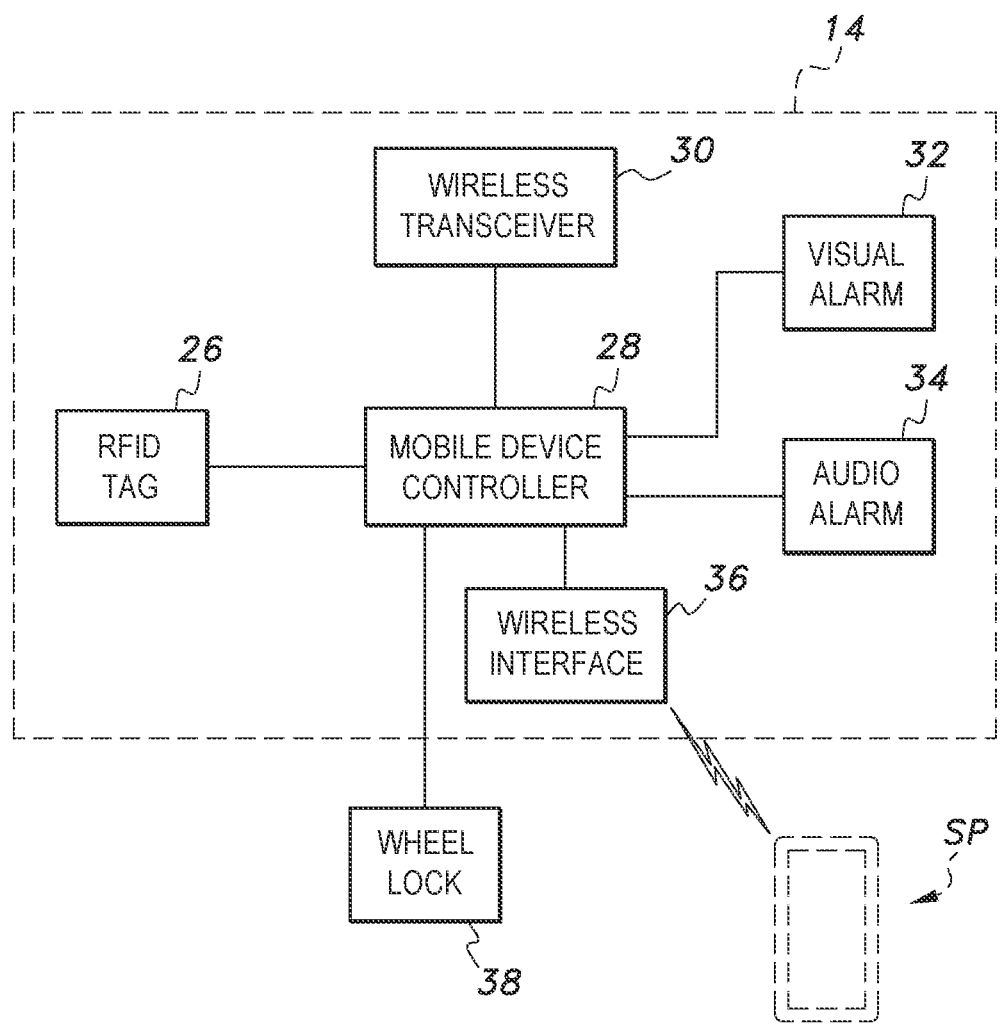
FIG. 3 is a block diagram of a mobile device in the system for social distancing compliance of FIG. 1.

As shown in FIGS. 2 and 3, each detector unit 12 may include, for example, a radio frequency identification (RFID) reader 24 for reading an RFID tag 26 associated with each mobile device 14 for identifying the particular mobile device 14 and the person associated with the particular mobile device 14. In addition to the RFID reader 24 and RFID tag 26, or as an alternative thereto, each mobile device 14 may carry a wireless transceiver 30 for wirelessly transmitting the identification information to a wireless transceiver 18 of the nearest detector unit 12 (shown as outgoing wireless signals $W_1$ and $W_2$ in FIG. 1). It should be understood that any suitable type of wireless communication may be used, such as, but not limited to, the aforementioned RFID, Bluetooth®, Bluetooth® Low Energy, Wi-Fi or the like.

In order to input particular identification information associated with the person using the mobile device 14, the mobile device 14 may have a wireless interface 36 for communicating with a device or interface belonging to the person. In FIG. 3, a conventional smartphone SP belonging to the person is used to connect with the wireless interface 36 of the mobile device 14. The wireless interface 36 is in communication with a mobile device controller 28 for receiving the information received from smartphone SP. It should be understood that any suitable type of wireless communication between wireless interface 36 and smartphone SP may be used, such as, but not limited to, Bluetooth®, Bluetooth® Low Energy, near field communication (NFC) or the like.

At least one distance is then calculated between the at least two people. For example, if there are two shoppers, as in FIG. 1, then a single distance is calculated between the two shoppers. If there are three shoppers, then three distances are calculated between the shoppers (i.e., a distance between the first and second shoppers, a distance between the first and third shoppers, and a distance between the second and third shoppers), etc.

Each detector unit 12 includes a detector controller 22 in communication with the corresponding thermal image sensor 20. The local detector controller 22, or the overall system controller 16, which is in communication with the multiple detector controllers 22 associated with the multiple detector units 12 (in the example of FIG. 1), is configured for calculating the at least one distance between the at least two people and determining if the at least one distance is less than a predetermined threshold value. For example, each calculated distance can be compared against a minimum safe threshold value of six feet.

The detector controller 22 may be used for initial processing of the data from the associated thermal image sensor 20, for example, and this initially processed data may then be sent to the system controller 16 for advanced image processing and distance calculation, as will be described in greater detail below. It should be understood that detector controller 22 and mobile device controller 28 may be any suitable type of controller, such as, but not limited to, a microprocessor, a programmable logic controller, control circuitry or the like. Similarly, it should be understood that the system controller 16 may be any suitable type of controller, such as, but not limited to, a microprocessor, a processor, a programmable logic controller, a personal computer, a computer workstation, a server or the like.

In order to calculate the at least one distance, at least two heat maps are generated, corresponding to the at least two people, respectively. The heat maps are generated from the raw data received by the at least one thermal image sensor 20. The at least two heat maps are converted to at least two grayscale heat maps, respectively, and the at least two grayscale heat maps are then converted into at least two binary images, respectively.

Figure 4:
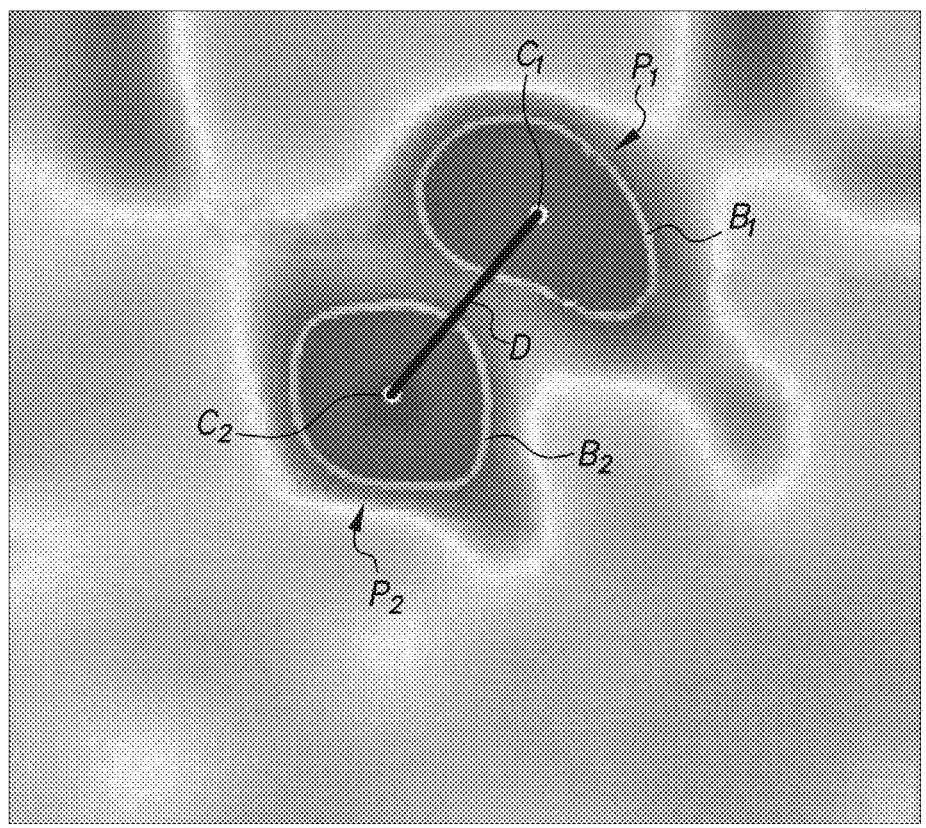
FIG. 4 shows a thermal image generated by the detector of FIG. 2.

FIG. 4 shows an exemplary image generated during testing of the system 10. In general, at least two contours in the at least two binary images are detected, respectively, where the contours represent bodies of the at least two people. In the example of FIG. 4, two people $P_1$ and $P_2$ are detected, and their respective boundary contours $B_1$ and $B_2$ are determined. The boundary contours $B_1$ and $B_2$ represent the borders of the physical bodies of the two people $P_1$ and $P_2$. The center of each of the at least two contours is determined, and at least one center-to-center distance between the centers of the contours is calculated. The distance between the two people is equal to the center-to-center distance. Returning to the example of FIG. 4, once the boundary contours $B_1$ and $B_2$ are determined, the geometric centers $C_1$ and $C_2$, respectively, of the boundary contours $B_1$ and $B_2$ can be determined. Once the centers $C_1$ and $C_2$ have been found, the distance D therebetween can be easily calculated, and this distance D is used for comparison against the predetermined threshold value of a safe distance. For example, the image of FIG. 4 can be mapped onto a Cartesian grid, and the centers $C_1$ and $C_2$ can be mapped to Cartesian points $(x_1, y_1)$ and $(x_2, y_2)$, respectively. The distance D is then given by $$D = \sqrt{(x_2 - x_1)^2 + (y_2 - y_1)^2}.$$

If the two people are separated from one another by less than the predetermined value, at least one of the people is alerted that the minimum safe distance is not being met. The wireless transceiver 18 of the nearest detector unit 12 transmits an alarm actuating signal to at least one of the mobile devices 14 (illustrated as wireless signals $W_3$ and $W_4$ in FIG. 1), depending upon the particular situation, and the wireless transceiver 30 associated with the mobile device 14 actuates a local alarm for alerting the corresponding person. Each mobile device 14 may carry an audio alarm 34, a visual alarm 32, or both.

For example, each person's smartphone SP may have an app stored thereon for providing a particular user interface to be used with the system 10. Each person may have a user account set up via the app, which includes identification information associated with the person. As shown in FIG. 3, the mobile device controller 28 may communicate with an automated wheel lock 38, which locks one or more wheels of the shopping cart used by the person. Thus, until the person communicates with the mobile device 14, via the user account associated with the app on the person's smartphone SP, the shopping cart cannot be used.

Active tracking of each of the shopping carts $SC_1$ and $SC_2$ (in the simplified example of FIG. 1) can begin upon user actuation and unlocking of the respective wheels locks 38, or may begin once the particular shopping cart has passed a particular gate or location within the grocery store. As noted above, an alarm signal is sent to at least one of the mobile devices 14 and not necessarily both. In FIG. 1, if shopping cart $SC_1$ is stopped and shopping cart $SC_2$ is approaching, only signal $W_4$ may be transmitted to specifically alert the user of shopping cart $SC_2$ that shopping cart $SC_2$ is less than six feet away from shopping cart $SC_1$. If shopping cart $SC_2$ fails to stop or change direction to maintain proper social distancing, the alarm associated with this shopper's mobile device 14 will continue. Additionally, system controller 16 can send a separate alert to store staff regarding this violation of social distancing policy. Since each shopper is identified by the system, a log of the violation, including the particular user(s) involved, can be recorded. Once the proper distance has been restored, the local alarm can be ceased.

In FIG. 1, if both shopping carts $SC_1$ and $SC_2$ are moving and the system 10 determines that they are less than the predetermined safe distance threshold from one another, then both signals $W_3$ and $W_4$ are transmitted to actuate the alarms of both mobile devices 14. If neither person stops or alters their course within a predetermined amount of time (e.g., five seconds), the system controller 16 can send a separate alert to store staff regarding this violation of social distancing policy. Since each shopper is identified by the system, a log of the violation, including the particular users involved, can be recorded. Once the proper distance has been restored, the local alarms can be ceased. Since both shopping carts $SC_1$ and $SC_2$ are being tracked, the system 10 can determine if one person stops and if the other person continues at the unsafe distance. In this case, a violation may be logged for only the person who ignored the alarm. Additionally, since both compliance and violations can be logged, a reward and/or punishment system can be associated with the particular store and/or the user accounts.

It should be understood that the mobile devices 14 can be used in conjunction with, or be integrated with, existing shopping technology. For example, a barcode scanner or the like may be integrated into each mobile device 14 for scanning purchased goods and confirming prices. As a further example, the mobile device 14 can include, or be connected to, a scale for weighing purchased items, providing authentication that the user has scanned an item before placing it in the shopping cart and/or paying for the groceries. The monitoring aspects of system 10 may also be used to ensure that the shopping carts are returned to their proper locations once the shoppers are finished using them.

It is to be understood that the system and method for social distancing compliance is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for social distancing compliance, comprising the steps of:
   detecting at least two people by thermal imaging;
   calculating distance between the at least two people, wherein the calculation includes the steps of:
     generating at least two heat maps corresponding to the at least two people, respectively;
     converting the at least two heat maps to at least two grayscale heat maps, respectively;
     converting the at least two grayscale heat maps into at least two binary images, respectively;
     detecting contours of the at least two binary images, respectively, wherein the contours correspond to contours of the at least two people, respectively;
     determining a center of each of the contours, respectively; and
     calculating center-to-center distance between the respective centers of the contours of the at least two people, wherein the distance between the at least two people is equal to the center-to-center distance;
   determining if the distance is less than a predetermined threshold value; and
   alerting at least one of the at least two people when the distance is less than the predetermined threshold value.

2. The method for social distancing compliance as recited in claim 1, further comprising the step of identifying the at least two people.

3. The method for social distancing compliance as recited in claim 2, wherein the step of identifying the at least two people comprises wirelessly reading identification data associated with the at least two people, respectively.

4. The method for social distancing compliance as recited in claim 3, wherein the step of wirelessly reading the identification data respectively associated with the at least two people comprises reading an RFID tag associated with each of the at least two people.

5. The method for social distancing compliance as recited in claim 1, wherein the step of alerting the at least one of the at least two people comprises actuating at least one alarm selected from the group consisting of an audio alarm and a visual alarm.

6. A system for social distancing compliance, comprising:
   at least one thermal image sensor for detecting at least two people by thermal imaging;
   a detector controller configured for calculating at least one distance between the at least two people and determining if the at least one distance is less than a predetermined threshold value, wherein the detector controller is further configured to:
     generate at least two heat maps respectively corresponding to the thermal images of the at least two people by the at least one thermal image sensor;
     convert the at least two heat maps to at least two grayscale heat maps, respectively;
     convert the at least two grayscale heat maps into at least two binary images, respectively;
     detect contours of the at least two binary images, respectively, the contours of the at least two binary images corresponding to contours of the bodies of the at least two people;
     determine a center of the contours; and
     calculate center-to-center distance between the centers of the contours, the distance between the at least two people being equal to the center-to-center distance between the centers of the contours;

at least two mobile devices associated with the at least two people, respectively, each of the mobile devices including an alarm; and at least one wireless transceiver in communication with the detector controller for transmitting at least one alarm actuation signal to at least one of the mobile devices for actuating the alarm thereof when the at least one distance is less than the predetermined threshold value.

7. The system for social distancing compliance as recited in claim 6, further comprising means for identifying the at least two people.

8. The system for social distancing compliance as recited in claim 7, wherein the means for identifying the at least two people comprises means for wirelessly reading identification data respectively associated with the at least two people.

9. The system for social distancing compliance as recited in claim 8, wherein the means for wirelessly reading the identification data respectively associated with the at least two people comprises an RFID reader configured to read RFID tags incorporated into the mobile devices associated with each of the at least two people.

10. The system for social distancing compliance as recited in claim 9, wherein each of the at least two mobile devices comprises an RFID tag associated with the corresponding one of the at least two people.

11. The system for social distancing compliance as recited in claim 6, wherein each said alarm is at least one alarm selected from the group consisting of an audio alarm and a visual alarm.

\* \* \* \* \*